Jan. 8, 1952 W. J. MILESKI 2,581,767
METHOD OF MANUFACTURE OF LEAK-PROOF INNER TUBES
Filed Oct. 18, 1946
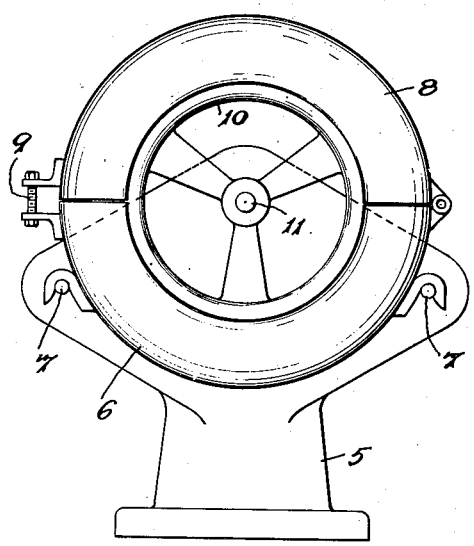
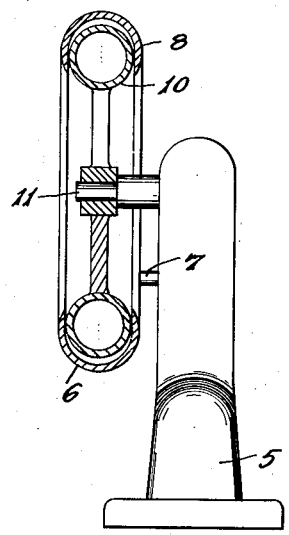
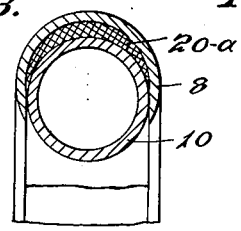
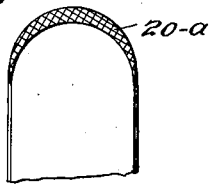
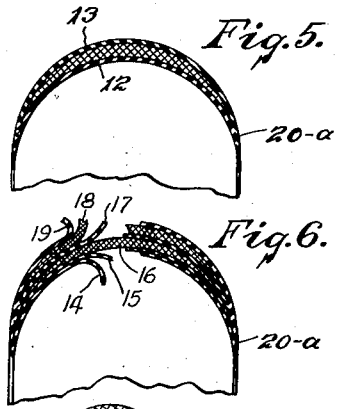
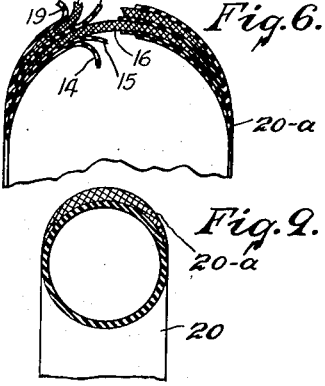
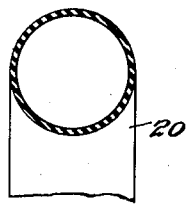
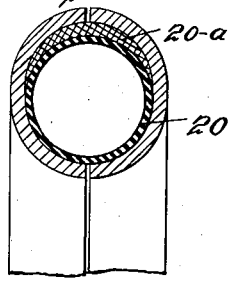
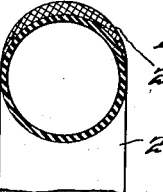
INVENTOR.
WILLIAM J. MILESKI.
BY Louis V. Lucia
ATTORNEY.

Patented Jan. 8, 1952

2,581,767

UNITED STATES PATENT OFFICE 2,581,767

METHOD OF MANUFACTURE OF LEAKPROOF INNER TUBES

William J. Mileski, Norwich, Conn.

Application October 18, 1946, Serial No. 703,944

5 Claims. (Cl. 154—15)

This invention relates to a method of manufacture of a leak proof inner tube and more particularly to the method of constructing a leak proof inner tube for tires.

Leak proof tubes have been heretofore produced having a liner secured to the outer surface of the tube and which consists of a plastic material that retains a characteristic of flowability and operates to seal a puncture in the tube by flowing into the opening caused by the puncture.

As heretofore constructed, however, the sealing liner and the tube have both been placed in an uncured condition within a mold and then vulcanized together in a single operation to a fully cured condition in which the tube and the liner are adhered together. Such method of vulcanizing the liner and the tube together has not proved satisfactory for the reason that, since the liner when applied over the tube forms an uneven cross-sectional area around the tube which is thickest at the portion of the tube where the liner is applied, the heat of the vulcanizing process fails to penetrate through said thick portion to the same degree that it penetrates the remaining portion of the tube. Therefore, the result obtained by the heretofore used method of vulcanizing such tubes has resulted in tubes which were overcured at their thin portions and undercured at their thick portions so that the life of the tubes has been drastically reduced for the reason that the different undercured and overcured portions remained, respectively, in a gummy condition which greatly reduced their strength and durability and in many cases were easily deformed or broken due to the uncured or overcured condition of the material and particularly that of the rubber tube itself.

The primary object of this invention, therefore, is to provide a tube having a sealing liner vulcanized thereto and in which both the tube and the liner are cured to the proper degree for providing normal resiliency, flexibility and strength in the material of the tube and at the thickest portion thereof as well as at the thin portion.

A further object of this invention is to provide a method of vulcanizing or curing the said tubes in a manner which will produce a fully and evenly cured tube and liner throughout all of the portions thereof.

A still further object of the invention is to provide a leak proof inner tube for tires having a plastic liner therearound which will remain indefinitely in a viscid state so that it will fill an aperture in said tube to prevent leakage of air therefrom.

Further objects and advantages of this invention will be more clearly understood from the following description and from the accompanying drawings, in which—

Fig. 1 is a front view of one form of a vulcanizing apparatus that may be used in connection with my invention.

Fig. 2 is a side view thereof, partially in central vertical section.

Fig. 3 is an enlarged fragmentary view, in central vertical section, of a part of said apparatus.

Fig. 4 is a fragmentary view, in central vertical section, of a portion of a tube liner embodying my invention.

Fig. 5 is an enlarged fragmentary view, in central vertical section, of a modified form of a liner.

Fig. 6 is a similar view showing a further modified form of liner.

Fig. 7 is a fragmentary view, in central vertical section, of a portion of an inner tube on the same scale as Figs. 3 and 4.

Fig. 8 is a similar view showing the operation of vulcanizing a liner onto a tube.

Fig. 9 is a similar view showing the tube in its completed form with the liner vulcanized thereto.

As illustrated in Figs. 1 and 2, apparatus adaptable for producing liners comprising my invention may be of well known construction and preferably such as includes a stand 5 upon which is supported a mold casing consisting of a lower half 6, which is supported upon pins 7—7 on said stand, and an upper half 8 hinged to the lower half and securable in closed relation thereto by means of a suitable fastening 9. An inner form, in the shape of a wheel 10, is rotatably supported on a post 11. The said wheel has a contour corresponding to the inner surface of the liner which is to be formed thereon and the mold sections 6 and 8 have inner contours corresponding to the outer surface of said liner; thereby leaving a space between the wheel 10 and the casing sections 6 and 8 corresponding to the cross-sectional form of the liner.

In the production of a liner embodying my invention, the plastic material may be placed upon the outer surface of the wheel 10, as clearly shown in Fig. 3, and the two halves 6 and 8 of the mold casing may then be closed thereover to press the said plastic material upon the contour of the wheel and thereby produce the cross-sectionally crescent shaped liner, as clearly shown in Fig. 3.

The mold casing and wheel may then be heated in any suitable way, such as by placing it in a heated chamber, or by passing steam through suitable ducts associated therewith, to thereby apply heat to the liner for partly curing it to a predetermined degree.

In the form shown in Fig. 4, the liner 20-a is constructed entirely of a single plastic material which is placed upon the mold as illustrated in Fig. 3 and processed as above described. The plastic material may be such as masticated rubber, in which have been added a softener and adhesives to provide the desired degree of tack and viscidity. A small amount of a curing agent, such as sulphur, may be sprinkled upon the exterior of the said liner so that a skin of cured rubber will be formed over said liner while the inside material will remain under pressure and in a permanently viscid state so that, when a puncture occurs through the liner and leaves an opening in the inner tube, the said plastic material will immediately flow into said opening and seal it against leakage.

In the modified form shown in Fig. 5, the said liner 20-a may be constructed with an inner cover 12 and an outer covering 13 between which is contained the plastic material. In the further modified form shown in Fig. 6, the liner is constructed for heavy duty tubes and may comprise an inner covering 14 which is adhered to a primary inner covering 15, a layer of plastic material 16, an intermediate layer of inner tube stock 17, an outer layer of plastic material 18, and an outer covering 19 which may also be of inner tube stock. The liners 14—15, as well as the liners 12—13, may be made of any material suitable for the purpose, although it has been found that regular inner tube stock is entirely satisfactory when used in connection with the method provided by my present invention.

The curing of said liner may be performed within the molding apparatus above described or by other suitable means after the liner has been formed. In accordance with my invention, however, it is important that the said liner be only partly cured before it is applied to the inner tube such as shown at 20 and that the tube itself also be only partly cured. It has been found most desirable to cure the liner, as well as the tube, only for approximately from one-half to three-quarters of the degree which is desired in the leak proof tube when it has been completed. After the said liner and tube have been separately pre-cured to the degree above mentioned, they are placed together within a mold of conventional form, such as illustrated in Fig. 8, and air pressure may be applied to the tube in order to force it into firm contact with the inner surface of the liner, as clearly shown. The joined liner and tube are then cured by suitable means, while still in the mold, until they have reached a fully cured condition. This will provide a completed tube, as illustrated in Fig. 9, in which the liner is firmly and securely vulcanized thereto and in which both the tube and liner are fully cured clear through all portions thereof regardless of their varying thicknesses and without any gummy or partly cured soft spots such as have been found very prevalent in such tubes produced by heretofore used methods wherein the tube and the liner have been vulcanized together and fully cured at one time in a single operation.

The tube may be of any good well known rubber material such as normally used in inner tubes and having the normal amount of curing agent.

No adhesive is used between the liner and the tube since it has been found that my above described process will provide a highly satisfactory, durable, and practical connection between the two members. However, a suitable adhesive may be used in cases where such is found preferable.

It will be clearly understood from the above description that my invention provides a novel method which is highly desirable for evenly curing articles composed of different layers of material and/or portions of different thicknesses by first separately subjecting each of the layers to a pre-curing operation wherein it is cured for a portion of the total curing ultimately applied to said article, and then completing the curing operation after the members have been joined together.

It has been found that the final curing operation, while the two members are joined together, is entirely sufficient for producing a complete seal between the liner and the tube and that it will produce a highly efficient and long lasting leak proof tube having a liner thereon which is in a permanently viscid condition and in which tube all portions thereof are fully cured to the proper degree for the most satisfactory results.

I claim:

1. The method of manufacturing a leakproof tube consisting of a plurality of layers of plastic material producing portions of different thicknesses in said tube; the said method consisting of partly curing each of said layers before they are joined together, then joining them together, and then completing the curing operation.

2. The method of manufacuring a leakproof inner tube having a liner of viscid plastic material which consists of forming said liner of plastic material and within a mold while free of a curing agent, applying a curing agent upon the outer surface of said liner, heating said liner under pressure to partly cure the exterior thereof and thereby provide a skin over a core of viscid material, then applying said partly cured liner to a partly cured inner tube and vulcanizing the tube together while completing the curing of said liner and tube.

3. The method of uniting a puncture sealing material to a rubber tube, the said method comprising the steps of forming a liner of uncurable viscid plastic material, applying a curing agent to the surface of said liner to render curable that portion of the material which is adjacent the surface of the liner, heating the liner until the said portion of the material is partly cured and thereby providing a skin of partly cured material over a portion of uncurable viscid plastic material within the liner, heating the tube until it is partly cured, and then applying the partly cured skin against the partly cured tube and further heating said skin and tube jointly.

4. The method of uniting an inner tube and a liner for sealing punctures in said tube, the said method including the steps of forming the liner of an uncurable viscid plastic material, applying a curing agent over the surface of said liner and thereby rendering curable the portion of the said material adjacent the surface of the liner, heating said liner to provide a partly cured encasing skin over the viscid material, heating the tube until it is partly cured, and then applying the liner over the tube and further heating them jointly to secure the liner to the tube and complete the curing of said tube and liner and thereby provide an integral structure in which the tube and the skin of the liner are substantially uniformly cured and a permanently viscid material is contained within the said skin.

5. The method of forming a puncture sealing liner for a rubber tube which includes the steps of forming the liner of an uncurable viscid sealing material, applying a curing agent to the surface of said liner to render curable the portion of said material adjacent said surface, heating said liner to cure the curable portion of the material and thereby provide an encasing skin for said sealing material, and applying said liner to said tube.

WILLIAM J. MILESKI.

REFERENCES CITED

The following references are of record in the file of this patent:

UNITED STATES PATENTS

| Number | Name | Date |
|---|---|---|
| 836,772 | Marks | Nov. 27, 1906 |
| 1,217,888 | Wildman et al. | Feb. 27, 1917 |
| 1,237,698 | Reuter | Aug. 21, 1917 |
| 1,244,236 | Oberfelder | Oct. 23, 1917 |
| 1,462,452 | Kilborn et al. | July 17, 1923 |
| 1,470,442 | Grosjean | Oct. 9, 1923 |
| 1,498,017 | Crombie et al. | June 17, 1924 |
| 1,958,131 | Davidson | May 8, 1934 |
| 2,099,514 | Eberhard | Nov. 16, 1937 |
| 2,231,182 | Eger | Feb. 11, 1941 |
| 2,337,985 | Freedlander | Dec. 28, 1943 |
| 2,354,424 | Novotny et al. | July 25, 1944 |
| 2,372,382 | Krusemark | Mar. 27, 1945 |
| 2,392,590 | Hulswit et al. | Jan. 8, 1946 |
| 2,418,025 | Garvey | Mar. 25, 1947 |

OTHER REFERENCES

Ser. No. 373,283, Grabec (A. P. C.), published May 11, 1943.